United States Patent

[11] 3,622,561

[72] Inventors Morris J. Robins;
 Roland K. Robins; Dennis A. Shuman, all of
 Salt Lake City, Utah
[21] Appl. No. 851,041
[22] Filed Aug. 18, 1969
[45] Patented Nov. 23, 1971
[73] Assignee University of Utah

[54] NUCLEOSIDE SUGAR ESTERS OF SULFAMIC ACID AND METHOD FOR PREPARATION OF THE SAME
6 Claims, No Drawings
[52] U.S. Cl .................................................. 260/211.5R, 424/180
[51] Int. Cl ........................................................ C07d 51/52, C07d 51/54
[50] Field of Search .......................................... 260/211.5, 543 R, 457, 234

[56] References Cited
UNITED STATES PATENTS
3,017,407 1/1962 Petracek et al. .............. 260/234
3,057,855 10/1962 Smith et al. ................... 260/234

Primary Examiner—Lewis Gotts
Assistant Examiner—Johnnie R. Brown
Attorney—C. Harvey Gold ABSTRACT: Novel nucleoside sugar esters of sulfamic acid having the formula

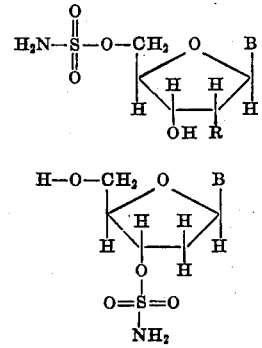

where R is selected from the group consisting of hydrogen and hydroxyl and B is a nucleic acid base selected from the group consisting of adenine, hypoxanthine, guanine, cystosine, uracil, and thymine and a method for preparing the esters. The esters are useful as antibacterial, antitrypanosamal, and, in vitro anticancer agents.

NUCLEOSIDE SUGAR ESTERS OF SULFAMIC ACID AND METHOD FOR PREPARATION OF THE SAME

The invention described herein was made in the course of work under a grant or award from the Department of Health, Education and Welfare.

BACKGROUND OF THE INVENTION

Nucleocidin is a potent antitrypanosomal antibiotic that occurs naturally in nature. The chemical structure of this compound is thought to be

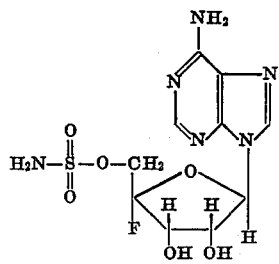

(1)

The compound is particularly active against the organisms causing certain types of sleeping sickness, e.g., in Africa the sleeping disease organism is known as *Trypanosoma rhodesiense* and in South America the disease organism is known as *Trypanosoma cruzi*. The seriousness of the sleeping sickness disease is demonstrated by the fact, that, for example, in the country of Brazil approximately 28 percent of the male population die of the disease. Sulfamate esters such as nucleocidin with an unsubstituted nitrogen are rare and nucleocidin is the only known antibiotic containing the sulfamate ester group. In addition, this compound is one of the very few naturally occurring fluoro compounds. Applicants have prepared new synthetic sulfamate esters of nucleosides that are substantial structural models of nucleocidin shown to be useful as antibacterial, antitrypanosamal, and anticancer agents in that they exhibit a pronounced inhibition of *Streptococcus faecalis* and *Trypanosoma rhodesiense*.

SUMMARY OF THE INVENTION

In its broadest form the invention relates to nucleoside sugar esters of sulfamic acid having the formula

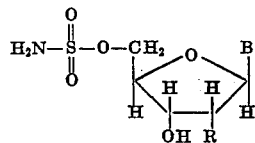

(2)

where R is selected from the group consisting of hydrogen and hydroxyl and B is a nucleic acid base selected from the group consisting of adenine, hypoxanthine, guanine, cytosine, uracil, and thymine.

In another embodiment of the invention the nucleoside sugar ester of sulfamic acid has the formula

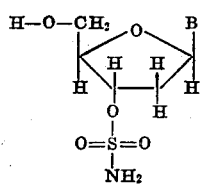

(3)

Still another embodiment of the invention relates to a method for preparing the nucleoside sugar esters of the type herein set forth.

DESCRIPTION OF THE PREFERRED EMBODIMENT

Nucleoside sugar esters of sulfamic acid having the general formula

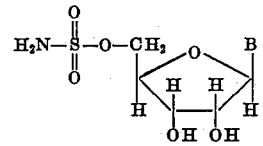

(4)

where B is a nucleic acid base selected from the group consisting of adenine, hypoxanthine, guanine, cytosine, uracil, and thymine are synthesized by reacting a nucleoside such as adenosine, inosine, cytidine, uridine, etc., having the general formula

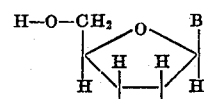

(5)

where B is selected from the group consisting of adenine, hypoxanthine, guanine, cytosine, uracil, and thymine with either an ortho ester such as triethyl orthoformate, trimethyl orthoformate, triethyl orthoacetate, trimethyl orthoacetate, trimethyl orthobenzoate, triethyl orthobenzoate, etc.; an aldehyde such as acetaldehyde, benzaldehyde, p-(N,N-dimethyl)-benzaldehyde p-methoxybenzaldehyde, etc.; or a ketone such as acetone, cyclopentanone, cyclohexanone, diethyl ketone, etc., in the presence of an acidic catalyst, i.e., any acid, such as formic acid, acetic acid, hydrochloric acid, sulfuric acid, etc. to block the 2' and 3' hydroxyl groups of the nucleoside and produce a compound having the general formula

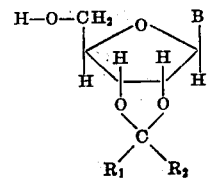

(6)

where $R_1$ and $R_2$ are hydrogen, methoxyl, ethoxyl, phenyl, methyl, p-methoxyphenyl, ethyl, etc., as determined by the groups attached to the reacting carbon of the respective ortho ester, aldehyde or ketone. The thus-formed blocked nucleoside is then reacted with an ionizing base such as sodium hydride, lithium hydride, sodium amide, potassium amide, etc., in an aprotic solvent such as 1,2-dimethoxyethane, p-dioxane, N,N-dimethylformamide, N,N-dimethylacetamide, pyridine, etc., to produce a blocked nucleoside 5'-oxide salt in situ which is reacted subsequently with a sulfamoyl chloride such as sulfamoyl chloride, N-methylsulfamoyl-chloride, N-ethyl sulfamoyl chloride, N-ethoxy carbonyl-sulfamoylchloride, N-(N-propyl) aminocarbonyl-sulfamoylchloride, N-(S-methyl) carbonylsulfamoylchloride, etc., or alternatively the blocked nucleoside is reacted with sulfamoyl chloride in the presence of an acid-accepting base such as pyridine, triethylamine, 4 A. molecular sieves, etc., in an aprotic solvent, to produce the blocked nucleoside sulfamic acid ester having the general formula

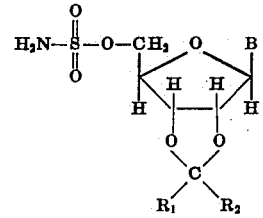

(7)

The 2' and 3' hydroxyl groups of the nucleoside are then deblocked to produce the desired sugar ester by reacting the nucleoside with an acidic catalyst of the type heretofore described in a protic solvent such as water, alcohols, mixtures of water and alcohol, etc. The concentration of the acidic catalyst is maintained at a level sufficient to deblock the molecule but sufficiently dilute so that the molecule is not destroyed and the sulfamic acid ester is not solvolyzed. The desired concentration can be insured by following the reaction, according to the established practice with thin layer chromatography (tlc).

If blocking of the 2' and 3' hydroxyl groups was accomplished through the use of an ortho ester the resulting product is then finally treated with a deblocking base such as ammonia, sodium hydroxide, ion exchange resins such as the resin known by the trademark Amberlite IR–45, sodium carbonate, etc. It is to be noted the base is used at a concentration sufficient to solvolyze the residual blocking group without solvolyzing the sulfamic acid ester of the nucleoside. This concentration can also be ensured by following the reaction with tlc.

Nucleoside sugar esters of sulfamic acid having a general formula

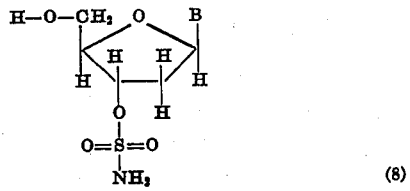

(8)

where B is selected from the group herein enumerated are synthesized by reacting a nucleoside such as 2'-deoxyadenosine, 2'-deoxycytidine, thymidine, 2'-deoxyinosine, etc., having the general formula

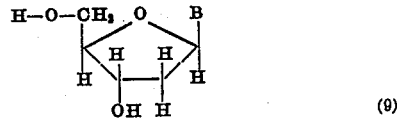

(9)

with a primary blocking reagent such as triphenylmethylchloride, p-anisyldiphenylmethyl chloride, etc., thereby producing a compound with the blocking group selectively joined to the nucleoside's primary alcohol position and having the general structural formula

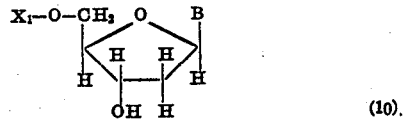

(10).

where $X_1$ is the blocking group. The resulting blocked compound is then reacted with the ionizing base and subsequently with the sulfamoyl chloride in the aprotic solvent or alternatively with the acid-accepting base and the sulfamoyl chloride in the aprotic solvent to produce a sulfamated nucleoside having the general formula

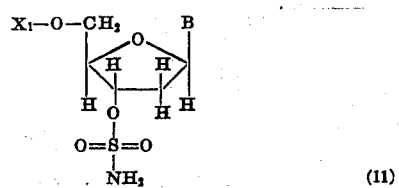

(11)

The sulfamated compound is then deblocked with the acidic catalyst in the protic solvent to produce the desired nucleoside sugar ester of sulfamic acid.

Nucleoside sugar esters of sulfamic acid having a general formula

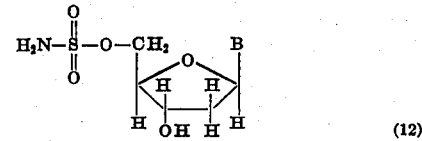

(12)

Where B is selected from the group herein enumerated are synthesized by reacting a nucleoside such as 2'-deoxyadenosine, 2'-deoxycytidine, thymidine, etc., having the general formula (9) with the primary blocking reagent. The resulting product is then reacted with a 3' hydroxyl blocking agent such as acetic anhydride, benzoyl chloride, p-toluyl chloride, etc., to produce a compound having the general structural formula

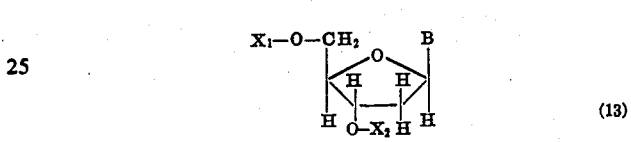

(13)

Where $X_2$ is the blocking function bonded to the oxygen of the 3'hydroxyl group. This compound is then reacted with the acidic catalyst in the protic solvent and the product is reacted with the ionizing base in the aprotic solvent and sulfamated by reaction with the sulfamoyl chloride or alternatively with the acid-accepting base and the sulfamoyl chloride in the aprotic solvent. Finally, as heretofore described, the resulting sulfamate product is deblocked by reaction with the deblocking base in the protic solvent to produce the desired compound.

The nucleoside sugar esters of this invention are useful antibacterial agents which inhibit the growth of organisms such as *Streptococcus faecalis* and *Escherichia coli* when added as an aqueous solution to a logrithmatically multiplying aqueous culture of the organism. They also have marked inhibitory activity against *Trypanosoma rhodesiense* in mice, when given to mice previously infected with the organism, and show in vitro inhibitory activity against certain cancer cell lines which are used for animal screening by the National Institutes of Health, Cancer Chemotherapy National Service Center when the compound is added as an aqueous solution to tumor cells in aqueous suspension.

The following examples will illustrate the practice of the invention and serve to demonstrate the results obtainable thereby:

EXAMPLE I

Preparation of 5'-O-sulfamoyladenosine. 31.7 mmol. of NaH was mixed into a suspension of mmol. mmol of 2'3'-O-ethoxymethylideneadenosine in 140 ml. of 1,2-dimethoxyethane. The resulting suspension was stirred at room temperature for 2 hours whereupon it was cooled to 4° c. 30.0 mmol. of sulfamoyl chloride in 25 ml. of 1,2-dimethoxyethane was added dropwise to the cooled suspension over a 15-minute period and the resulting mixture was stirred at 4° C. for 20 hours. 10 ml. of absolute ethyl alcohol was then added to the mixture whereupon the mixture was evaporated to dryness under reduced pressure at a temperature less than 40° C. 250 ml. of methyl alcohol was then added to the product and the resulting suspension was filtered and again evaporated to dryness under reduced pressure. The resulting product was mixed with 50 g. of silicic acid and 100 ml. of ethyl acetate and the mixture was once again evaporated to dryness under reduced pressure. 50 ml. of ethyl acetate was then added and removed under reduced pressure and this step was repeated two times. The resulting powder was added to a column containing 90 g. of silica gel and it was washed with 1.3 liters chloroform and 1.0 liters of a 1:1 mixture of chloroform and ethyl acetate and finally eluted with ethyl acetate to remove 2',3'-O-ethoxymethylidene-5'-O-sulfamoyladenosine. The appropriate fractions as determined by tlc were combined and evaporated under reduced pressure to yield a white foam. This foam was stirred at room temperature in 100 ml. of 5 percent formic acid for 18 hours, filtered and then neutralized to a pH of 7.5 with concentrated $NH_4OH$. The resulting solution was then cooled at 4° C. for 40 hours whereupon it was filtered and washed with cold water. The precipitate was dissolved in 150 ml. of 0.06 N HCl and the solution was neutralized to a pH of 7 with concentrated $NH_4OH$ and cooled to 4° C. for 2 days to form a precipitate that was filtered, washed with cold water and dried over $P_2P_5$ at 70° C. and 0.01 mm. Hg for 3 days. The resulting 2.0 g. of solid was shown by elemental analysis and a nuclear magnetic resonance spectroscopy to be 5'-O-sulfamoyladenosine.

EXAMPLE II

Preparation of 5'-O-sulfamoylinosine. 20 mmol. NaH was added to a solution of 8.7 mmol. 2' 3'-o-methoxymethylideneinosine in 70 ml. 1,2-dimethoxyethane and the resulting suspension was stirred for 3 hours. Thereafter, the suspension was cooled in an ice bath and 17 mmol. sulfamoyl chloride in 50 ml. 1,2-dimethoxyethane was slowly added to the suspension. The resulting mixture was then stirred at 4° C. for 48 hours whereupon 2 ml. of concentrated $NH_4OH$ was added and the product was evaporated to dryness under reduced pressure at a temperature of less than 30° C. The product was then partitioned between ethyl acetate and water and the organic layer was evaporated under reduced pressure. The resulting solid was dissolved in 100 ml. of 5 percent aqueous formic acid and the acid solution was stirred for 24 hours and evaporated under reduced pressure to give a solid. 50 ml. of methyl alcohol was added to the solid and the solution was stirred with 20 ml. of Amberlite IR-45 ion exchange resin for 10 hours. The solution was filtered and the filtrate was evaporated under reduced pressure. 70 ml. of water was then added to the product and the aqueous layer was extracted with chloroform. A mixture of methyl alcohol and ethyl alcohol was added to the product whereupon it was removed by evaporation and 1.94 g. of a white solid resulted which was shown by *tlc* to be 5'-O-sulfamoylinosine.

EXAMPLE III

Preparation of 5'-O-sulfamoyl-2'-deoxyadenosine. 0.25 g. NaH was added to 0.84 g. of 3'0-acetyl-2-deoxyadenosine in 200 ml. of 1,2-dimethoxyethane to form a suspension. After stirring the suspension for 0.5 hours it was cooled in an ice-bath whereupon 0.67 g. of sulfamoyl chloride in 10 ml. 1,2-dimethoxyethane was added dropwise and the mixture was maintained at 4° C. for 48 hours. Thereafter, 20 ml. of ethyl alcohol was added to the mixture and the solution was evaporated under reduced pressure to dryness. The resulting solid was triturated in 15 ml. of cold 0.06 N HCl, filtered and neutralized to a pH of 6.5 with 1.0 N $NH_4OH$. The resulting precipitate was cooled at 4° C. for 12 hours and was filtered and washed with cold water and then triturated with ethyl ether to give 0.78 g. of chromatographically pure 3'-O-acetyl-5'-O-sulfamoyladenosine. This product was then mixed with 10 ml. of methyl alcohol presaturated with $NH_3$ at -10° C. whereupon the resulting solution was sealed in a vessel and allowed to stand for 5 hours at room temperature. The solution was then evaporated to dryness, the resulting product was partitioned between water and chloroform, the aqueous layer was evaporated under reduced pressure, and the residue was dissolved in ethyl alcohol. This solution was then cooled and fractionally crystallized. The appropriate crystals, which were shown by tlc to be pure, were redissolved in water, filtered, and this solution was evaporated to dryness. The resulting amphorous solid was air dried at room temperature for 12 hours and then dried over $P_2O_5$ at 24° C. and 0.01 mm. Hg for 3 hours. The dried solid was shown by elemental analysis to be 5'-O-sulfamoyl-2'-deoxyadenosine monohydrate.

EXAMPLE IV

Preparation of 3'-O-sulfamoyl-2'-deoxyadenosine. 5.0 mmol. of NaH was added to a solution of 2.50 mmol. 5'-O-trityl-20'-deoxyadenosine in 25 ml. of 1,2-dimethoxyethane and stirred for 0.5 hours. The resulting suspension was cooled in an ice-bath while 4.9 mmol. of sulfamoyl chloride in 15 ml. 1,2-dimethoxyethane was slowly added thereto and the resulting suspension was stirred at 4° C. for 24 hours. 20 ml. of ethyl alcohol was then added to the suspension and the volitiles were removed under reduced pressure. The resulting syrup was partitioned between ethyl acetate and water and the ethyl acetate layer was twice washed with water. The organic layer was then dried over $NA_2SO_4$, filtered, and evaporated under reduced pressure to a foam. Thereafter, the foam was dissolved in chloroform and added to 25 g. of silica gel in a 3 × 15 cm. column. The chloroform was evaporated and the column was washed with 200 ml. chloroform and then eluted with ethyl acetate to remove 5'-O-trityl-3'-o-sulfamoyl-2'-deoxyadenosine as the product. The product was then mixed with 60 ml. of 80 percent acetic acid and the resulting solution was heated rapidly in an oil bath to 90°—93° C. and maintained at this temperature for 10 minutes. The solution was then rapidly cooled and evaporated under reduced pressure. 60 ml. of water was then added and the solution was extracted three times with 40 ml. ethyl acetate. Thereafter the aqueous layer of the solution was evaporated under reduced pressure and 50 ml. of ethyl alcohol was added, the solution was then evaporated to dryness under reduced pressure. 20 g. of silica gel and 80 ml. of methyl alcohol were then added to the product the solvent was again evaporated to dryness. The resulting powder was added to 220 g. of silica gel in a column and it was developed with 3 liters of a 98:2 ratio of ethylacetate and ethyl alcohol to remove 3'-O-sulfamoyl-2'-deoxyadenosine as the product.

EXAMPLE V

Preparation of 5'-O-sulfamoylthymidine. 0.70 g. of sulfamoyl chloride was added to a mixture of 0.87 g. of 3'-O-acetylthymidine in 50 ml. of 1,2-dimethyoxyethane and 1 g. of 4 A. molecular sieves. The mixture was stirred at room temperature for 12 hours and then an additional 0.70 g. of sulfamoyl chloride was added. 10 ml. of absolute ethyl alcohol was then added and the solution was evaporated under reduced pressure. To the resulting semisolid was added 400 ml. of methyl alcohol and the slurry thus produced was filtered and the filtrate was evaporated under reduced pressure to a semisolid product. Crystallization of the product with about 15 ml. methyl alcohol yielded 0.94 g. of 5'-O-sulfamoyl-3'-O-acetylthymidine. This product was then mixed with 70 ml. methyl alcohol presaturated with $NH_3$ at -10° C. The resulting solution was then sealed in a vessel and allowed to stand for 5 hours at room temperature. Then the solution was evaporated to dryness and dissolved in methyl alcohol and placed on a silica gel column. An air stream was passed through the column until it was dry whereupon the column was developed with 250 ml. of chloroform and then a 95:5 ratio of a mixture of chloroform and methyl alcohol to remove the product 5'-O-sulfamoylthymidine.

EXAMPLE VI

Preparation of 3'-O-sulfamoyl-2'-deoxycytidine. 20 mmol. of NaH was added to a solution of 10 mmol. 5'-O-trityl-2'-deoxycytidine in 140 ml. of 1,2-dimethoxyethane and the resulting suspension was stirred for 1 hour. The suspension was then cooled with an ice-bath and a solution of 20 mmol. sulfamoyl chloride in 20 ml. of 1,2-dimethoxyethane was added thereto. The volatiles were removed by evaporation under reduced pressure and 1 liter of ethyl acetate was added. The ethyl acetate was extracted with saturated $NaHCO_3$ and then with water. The organic layer was dried over $Na_2SO_4$ and evaporated under reduced pressure to 5.0 g. of a foam. 3.4 g. of the foam dissolved in ethyl acetate was then added to a column containing 130 g. of silica gel. The column was then dried and was washed with 2 liters of ethyl acetate and 1 liter of a 95:5 mixture of ethyl acetate and methyl alcohol. and finally a 90:10 mixture of ethyl acetate and methyl alcohol. The resulting product, 3'-O-sulfamoyl -5'-O-trityl2'-deoxycytidine, was recrystallized from a solution of methyl alcohol and ethyl alcohol and dried for 48 hours over $P_2O_5$ at 75° C. and 0.01 mm. Hg. 1.0 mmol. of the product was then added to 15 ml. of 80 percent aqueous acetic acid at 95° C. and the resulting solution was stirred for 15 minutes and then gradually cooled. The volatiles were removed by the addition of ethyl alcohol and evaporation under reduced pressure. Thereafter the resulting semisolid was partitioned between ethyl acetate and water. The organic layer was extracted several times with water and the combined aqueous layer was dissolved in a minimum volume of methyl alcohol and added to a silica gel column. The column was dried and developed with a 5:95 mixture of methyl alcohol and chloroform. The appropriate fractions, as determined by tlc were pooled and evaporated under reduced pressure. The resulting solid was recrystallized from ethyl alcohol and was dried over $P_2O_5$. Elemental analysis proved the solid to be 3'-O-sulfamoyl-2'-deoxycytidine.

EXAMPLE VII

An aqueous growth suspension of *Escherichia coli* bacterial organism was inoculated with a $3 \times 10^{-5}$ molar aqueous solution of 5-0-sulfamoyladenosine and the growth of the bacterial organism was inhibited by 50 percent.

EXAMPLE VIII

An aqueous growth suspension of *Escherichia coli* bacterial organism was inoculated with a $2 \times 10^{-5}$ molar aqueous solution of 5'-O-sulfamoyl-2'-deoxyodenosine and the growth of the bacterial organism was inhibited by 50 percent.

EXAMPLE IX

An aqueous growth suspension of *Escherichia coli* bacterial organism was inoculated with a $2 \times 10^{-4}$ molar aqueous solution of 3'-O-sulfamoyl-2+-deoxyadenosine and the growth of the bacterial organism was inhibited by 50 percent.

EXAMPLE X

An aqueous growth suspension of *Streptococcus faecalis* bacterial organism was inoculated with a $4 \times 10^{-6}$ molar aqueous solution of the compound of example VII and the growth of the bacterial organism was inhibited by 50 percent.

EXAMPLE XI

An aqueous growth suspension of *Streptococcus faecalis* organism was inoculated with a $2 \times 10^{-4}$ molar aqueous solution of the compound of example VIII and the growth of the bacterial organism was inhibited by 50 percent.

EXAMPLE XII

An aqueous growth suspension of *Streptococcus faecalis* organism was inoculated with a $9 \times 10^{-5}$ molar aqueous solution of the compound of example IX and the growth of the bacterial organism was inhibited by 50 percent.

EXAMPLE XIII

A $4 \times 10^{-7}$ molar aqueous solution of the compound of example VII was added to an aqueous suspension of Ehrlich ascites cancer cells and growth of the cells was inhibited by 50 percent.

EXAMPLE XIV

A $4 \times 10^{-7}$ molar aqueous solution of the compound of example VII was added to an aqueous suspension of Leukemia L-1210 cancer cells and the growth of the cells was inhibited by 50 percent.

EXAMPLE XV

A $10^{-9}$ molar concentration of 5'-o-sulfamoyladenosine exhibited pronounced in vitro inhibition of *Trypanosoma rhodesiense*.

We claim:
1. A nucleoside sugar ester of sulfamic acid having the formula:

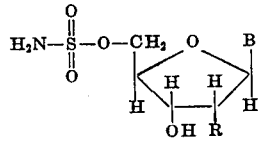

wherein R is selected from the group consisting of hydrogen and hydroxyl and B is a nucleic acid base selected from the group consisting of adenine, hypoxanthine, guanine, cytosine, uracil, and thymine.

2. The nucleoside sugar ester of claim 1 wherein B is the nucleic acid base adenine and R is a hydroxyl group.

3. The nucleoside sugar ester of claim 1 wherein B is the nucleic acid base adenine and R is hydrogen.

4. A nucleoside sugar ester of sulfamic acid having the formula:

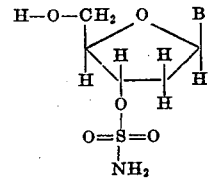

wherein B is a nucleic acid base selected from the group consisting of adenine, hypoxanthine, guanine, cytosine, uracil, and thymine.

5. The nucleoside sugar ester of claim 4 wherein B is the nucleic acid base adenine.

6. The nucleoside sugar ester of claim 4 wherein B is the nucleic acid base cytosine.

* * * * *